Jan. 13, 1970    KATSUJI FUJIWARA    3,489,348
FREE FLOAT STEAM TRAP

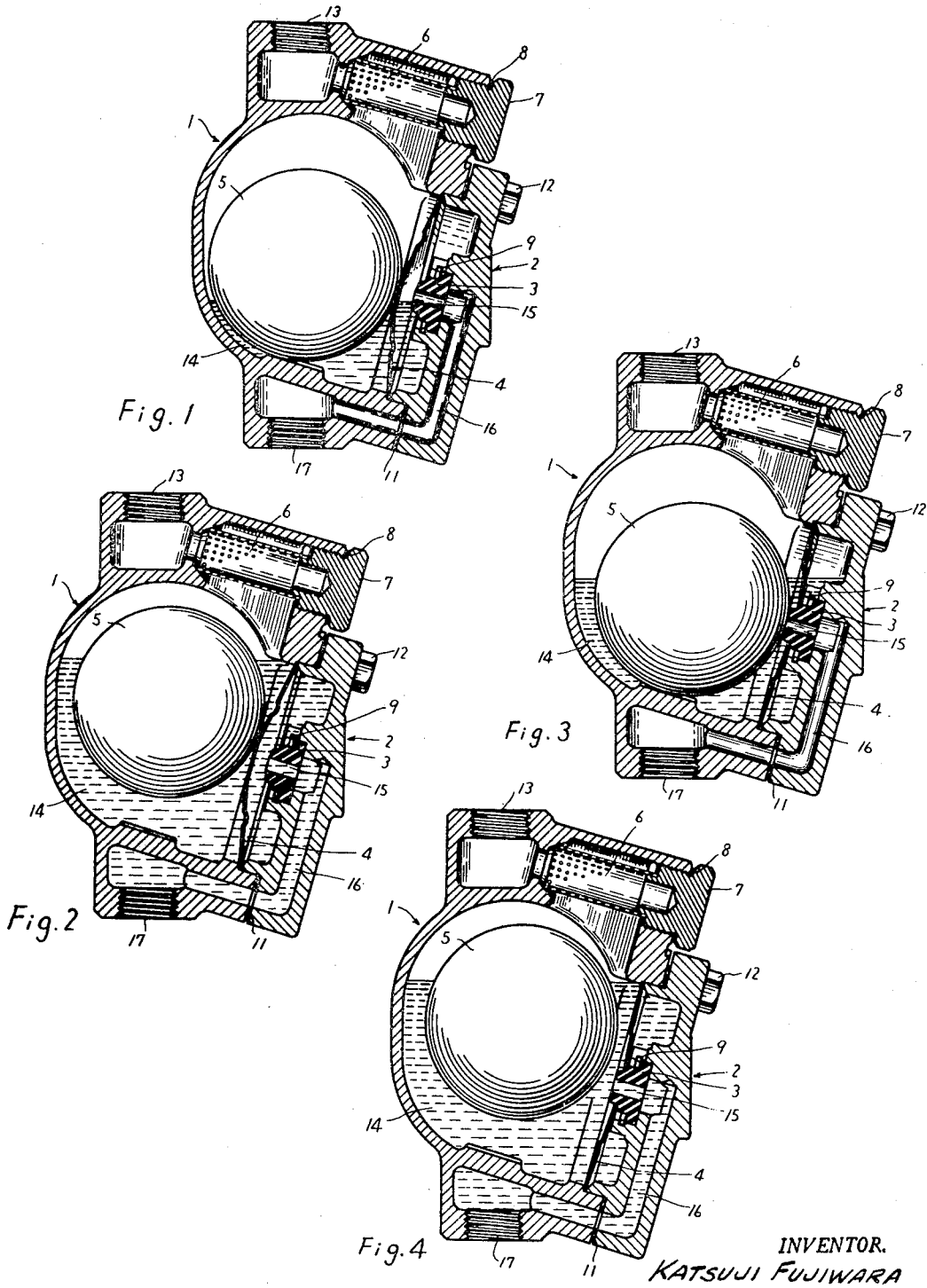

Filed Aug. 22, 1967    2 Sheets-Sheet 2

INVENTOR.
KATSUJI FUJIWARA
BY
ATTORNEY

United States Patent Office 3,489,348
Patented Jan. 13, 1970

3,489,348
FREE FLOAT STEAM TRAP
Katsuji Fujiwara, 191 Nishitani, Hiraoka-cho,
Hyoga-ken, Kakawa-shi, Japan
Filed Aug. 22, 1967, Ser. No. 662,402
Claims priority, application Japan, Jan. 11, 1967,
42/2,092
Int. Cl. F16t 1/02, 1/20
U.S. Cl. 236—53                              6 Claims

ABSTRACT OF THE DISCLOSURE

A free float steam trap embodying an improved construction for exhausting air from a steam system and collecting and discharging condensate.

---

This invention relates to an improved free float steam trap and more specifically to an improved steam trap embodying means reacting with the float to exhaust air contained in the steam system to which the trap is connected and at the same time collect and discharge condensate from the system.

Known steam traps utilizing free floats for controlling the discharge of condensate have been found most effective in preventing the accumulation of water in steam systems which causes water hammering and resultant damage to the pipes. Such traps, however, while functioning effectively to discharge condensate and at the same time preventing the escape of steam, do not provide for the exhaust of air which may be contained within the steam apparatus at the time it is prepared for use and separate means have had to be provided to discharge the air from the steam system. This invention provides a novel and improved free float steam trap which not only provides for the discharge of condensate from the system but also affords dependable and effective apparatus for automatically bleeding air from a steam system.

Another object of the invention resides in a novel and improved free float steam trap embodying means cooperating with the float which prevents the float from closing an associated outlet valve until air is discharged from the steam system and thereafter permit the float to close the valve and permit the trap to function in the normal manner for the collection and discharge of condensate.

The above and other objects and advantages of the invention will become more apparent from the following description and accompanying drawings forming part of this application.

In the drawings:

FIGURE 1 is a vertical sectional view of one embodiment of a free float steam trap in accordance with the invention and wherein means are provided to prevent engagement of the free float with the cooperating valve until the air has been exhausted from the associated steam system;

FIGURE 2 is a vertical sectional view similar to FIGURE 1 illustrating another phase of the operation of the structure in FIGURE 1;

FIGURE 3 is a vertical sectional view of the steam trap shown in FIGURES 1 and 2 and illustrating another aspect of the operation of the trap;

FIGURE 4 is a vertical sectional view of the trap shown in FIGURES 1, 2, and 3 illustrating still another phase of the operation of the trap;

Figure 5:
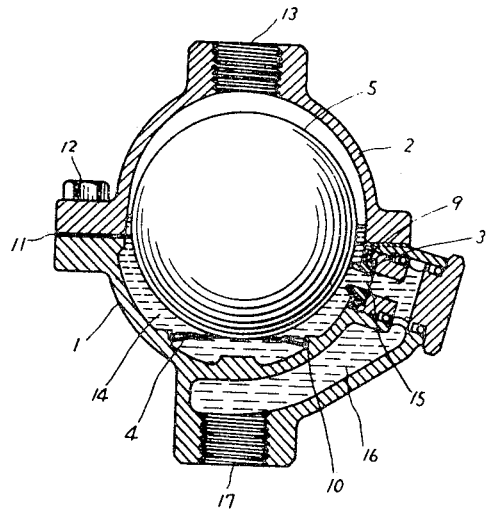
FIGURE 5 is a vertical sectional view of a modified embodiment of a free float steam trap in accordance with the invention.

Referring now to the drawings and more specifically to FIGURES 1 through 4, the trap is generally denoted by the numeral 1 and comprises essentially a hollow housing having a cover 2 which carries a valve seat 3 fixed in position by a snap ring 9. The valve seat 3 provides communication between the housing chamber and the outlet duct 16 which in turn communicates with the discharge outlet 17. The inlet 13 communicates with the housing chamber by means of a screen 6 held in position in a cooperating passage by a plug 7 which is sealed to the housing by a gasket 8. The cover 2 is sealed to the housing by suitable packing 11 and bolts 12 and the chamber within the housing contains a float 5 which cooperates with the valve seat 3 in the manner to be described.

Figure 6:
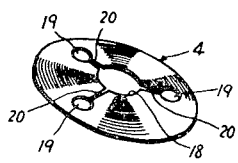
FIGURES 6 and 7 are perspective views of bi-metallic devices for utilization with the embodiments of the invention shown in FIGURES 1 through 5.

The steam trap in accordance with the invention further includes a bi-metallic element 4 illustrated more clearly in FIGURE 6. This bi-metallic element is essentially in disc form having three equally spaced openings 19, a central opening 18 and slots 20 connecting the central opening 18 with the surrounding openings 19. The central opening 18 has a larger diameter than the valve seat 3 and the bi-metallic element 4 is positioned concentrically with the valve seat 3 and is retained in position by engagement with an annular channel formed between the trap housing and the cover 2.

Referring more specifically to FIGURE 1, it will be observed that the condensate 14 is at a low level with the float 5 resting at the bottom of the chamber within the housing 1. This is also the condition of the trap before the steam system is activated so that the trap is cold and the bi-metallic element 4 is flexed outwardly away from the valve seat 3 and thereby holds the float 5 out of contact with the valve seat. When the steam system is activated, air within the system as well as the condensate will flow through the trap inlet 13 and into the chamber. If the condensate enters the inlet 13 prior to the air in the system, the condensate level will rise as shown in FIGURE 2 and thereby raise the float 5. However, since the bi-metallic element 4 is still flexed outwardly, the condensate will merely flow through the outlet 17 and be discharged from the system. At the same time the cold air from the system will flow through the trap and also be exhausted through the outlet 17.

After the cold air has been discharged from the associated steam system, steam will enter the trap and heat the bi-metallic element 4 causing it to flex inwardly toward the valve seat 3 as illustrated in FIGURE 3. Under this condition and assuming a low level of the condensate 14, the float 5 will rest on the bottom of the chamber within the trap and engage the valve seat 3. The pressure of the steam will hold the float 5 in engagement with the valve seat and thus seal the trap. It will be observed that the openings 19 and slots 20 permit the condensate to flow through and about the bi-metallic element 4. As the condensate level rises as illustrated in FIGURE 4, and attains a level sufficient to overcome the back pressure, the float will move away from the valve seat 3 permitting condensate to be discharged through the outlet 17 whereupon the float 5 will move downwardly to the closed position as illustrated in FIGURE 3.

As long as the trap and specifically the chamber therein is maintained at a temperature above a predetermined temperature, the bi-metallic device 4 will maintain the position shown in FIGURES 3 and 4. If the steam flow is terminated, the temperature of the trap will decrease, and when it attains a predetermined low temperature, the bi-metallic device 4 will immediately respond and flex outwardly as illustrated in FIGURES 1 and 2 to hold the float 5 away from the valve seat 3.

In the event trouble occurs during the use of the steam system and air flowing into the trap prevents the normal flow of the condensate, the float cannot displace itself from the valve seat. However, since the operation of the trap is prevented by air introduced from the steam system, the chamber will gradually lower in temperature by reason of normal heat radiation whereupon the bi-metallic device 4 will automatically move the float out of contact with the valve seat and permit discharge of the air. In so doing, the steam again entering the trap will heat the bi-metallic element 4 and move it to the position shown in FIGURES 3 and 4.

While the bi-metallic element illustrated and described in connection with the foregoing embodiment of the invention is in the form of a disc, it is obvious that other configurations may be utilized.

In the previous embodiment of the invention the bi-metallic element 4 surrounded the valve seat 3. It is not necessary however that the bi-metallic element be placed in that position but may be placed at any suitable position within the chamber which will permit it to react on the float to move the float out of engagement with the valve seat. Such a modified form of the invention is illustrated in FIGURE 5.

While the form of the invention illustrated in FIGURE 5 differs slightly in configuration from the form of the invention shown in FIGURES 1 through 4, it nevertheless comprises a housing portion 1 closed by a cover 2 secured to the housing 1 by means of bolts 12 and packing 11. The valve seat 3 is in the same relative position as the valve seat in the previous embodiment of the invention and the discharge means comprises passages 15 and 16 and outlet 17. The inlet 13 is in the top of the cover section 2. In this embodiment of the invention the bi-metallic element 4 is positioned at the bottom of the housing section 1 and held in place by a snap ring 10. It is evident that when the bi-metallic element 4 as shown in FIGURE 5 is in a position as illustrated in that figure, the float 5 cannot close the opening in the valve seat 3. However, when the bi-metallic element is heated it deflects downwardly thus permitting the float to engage the valve seat 3. Thus the embodiment of the invention as shown in FIGURE 5 is substantially identical in operation with the form of the invention illustrated in FIGURES 1 through 4.

Figure 7:
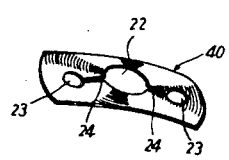

FIGURE 7 illustrates a modified form of bi-metallic element generally denoted by the numeral 40. It is of elongated configuration having a central opening 22, side openings 23 and slots 24 connecting the central opening with the side openings. It is evident that such bi-metallic element may be used in place of the element illustrated in FIGURE 6 in both of the previously described embodiments of steam traps in accordance with the invention. While the side openings 19 in the case of FIGURE 6 and 23 in the case of FIGURE 7 are desirable, it is evident that the bi-metallic element may be provided merely with a central opening.

Figure 9:
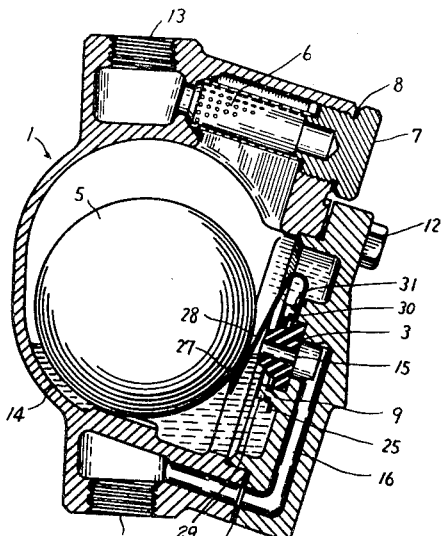
FIGURE 9 is a vertical sectional view of a trap similar to that illustrated in FIGURE 1 and utilizing the bi-metallic device illustarted in FIGURE 8.
Figure 8:
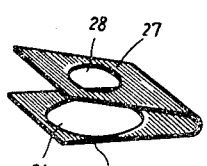
FIGURE 8 is a perspective view of still another form of bi-metallic device for use in connection with the trap in accordance with the invention.

Still another embodiment of the invention is illustrated in FIGURES 8 and 9. FIGURE 9 illustrated a steam trap which is identical to the steam trap illustrated in FIGURE 1 except that a modified form of bi-metallic element is utilized to perform the same function as the element 4 in FIGURE 1. Accordingly, a detailed description of the structure of FIGURE 9 is not believed necessary. The bi-metallic element illustrated more clearly in FIGURE 8, is of U-shape having an opening 26 in leg 25 of the U-shaped body and a similar opening 28 in the leg 27 of the body. This bi-metallic element is held in position over the valve seat 3 by engagement of the mounting opening 26 with the annular ridge 29 which is provided with an annular groove 30 for receiving a snap ring 31. The snap ring engages the edge of the opening 26 in the leg 25 and thus retains the bi-metallic element in position.

At low temperatures the angle between the legs 25 and 27 is substantially large as shown in FIGURE 9 and thus prevents the float 5 from engaging the valve seat 3. When the temperature within the trap increases as previously described in connection with FIGURES 1 through 4, the angle between the legs 25 and 27 of the U-shape bi-metallic element decreases and permits the valve seat to protrude through the opening 28 so that the float 5 may engage the valve seat 3 to seal the outlet. Thus the operation of the trap shown in FIGURE 9 is identical to the operation of the form of the invention shown in FIGURES 1 through 4.

While only certain embodiments of the invention have been illustrated and described, it is apparent that alterations, modifications and changes may be made without departing from the true scope and spirit thereof as defined by the appended claims.

What is claimed is:

1. A free float steam trap comprising a housing having a chamber therein, an inlet communicating with said chamber for admission of steam, air and condensate and outlet means including a valve seat communicating with said chamber, a float within said chamber said outlet being offset from said inlet to provide a path therebetween unobstructed by said float, said valve seat being positioned to engage said float to close said outlet when the condensate level in said chamber is low and move away from said seat when the condensate level is high, and bi-metallic means within said chamber and surrounding said outlet, said bi-metallic means having one position at a low temperature to prevent engagement of said float with said valve seat and another position at a high temperature to permit engagement of said float with said valve seat.

2. A free float steam trap according to claim 1 wherein said bi-metallic means is carried by said housing.

3. A free float steam trap according to claim 2 wherein said bi-metallic means is a bowed plate having a central opening registering with said valve seat, said plate being bowed outwardly away from said seat when in said one position and bowed inwardly toward said seat when in said other position with said seat protruding through said opening.

4. A free float steam trap according to claim 3 wherein said plate is circular and has a plurality of openings surrounding said central opening.

5. A free float steam trap according to claim 2 wherein said bi-metallic means is U-shaped with the legs thereof defining a relatively large angle when in said one position, said legs having openings therein with the opening in one leg surrounding said valve seat, and said trap includes means engaging the last said leg to hold the bi-metallic means in position and with the opening in the other leg aligned with said valve seat whereby said other leg in said one position is spaced outwardly from said valve seat and when in said other position is closely spaced to said one leg with the valve seat protruding through the last said opening.

6. A free float steam trap according to claim 2 wherein said bi-metallic means is a bowed plate disposed below said float and flexes upwardly in said one position and downwardly in said other position.

References Cited

UNITED STATES PATENTS

| | | | |
|---|---|---|---|
| 1,163,316 | 12/1915 | Brown | 137—192 X |
| 1,681,911 | 8/1928 | Spencer | 236—59 |
| 1,962,360 | 6/1934 | Pflugheber | 137—192 X |

ALAN COHAN, Primary Examiner

U.S. Cl. X.R.

137—192